Feb. 10, 1931.                    H. E. STORY                    1,791,912
                           CARBON MONOXIDE ELIMINATOR
                              Filed Nov. 17, 1926

INVENTOR
HAROLD E. STORY
BY
Oscar T. DeWitt
ATTORNEY

Patented Feb. 10, 1931

1,791,912

UNITED STATES PATENT OFFICE

HAROLD E. STORY, OF PITTSFIELD, MASSACHUSETTS

CARBON-MONOXIDE ELIMINATOR

Application filed November 17, 1926. Serial No. 148,819.

My invention relates to a new and useful improvement in carbon monoxide eliminators, primarily designed to be adapted to the exhaust of a motor vehicle, in which the carbon monoxide coming from the motor is caused to pass thru the device and the carbon monoxide thoroughly consumed by combustion, and finally passes into the air from the outer end of the exhaust pipe in a gaseous form as carbon dioxide, mixed with a small percentage of carbon monoxide.

Another object of the invention is to provide a carbon monoxide eliminator in which the carbon monoxide is heated from without by an electrical heating unit to a point of combustion, and the said carbon monoxide brought in contact with a water vapor of particular composition to increase the velocity of combustion.

The velocity of propagation of combustion of CO and O is greatly increased by the presence of a trace of water vapor. In the case of carbon monoxide mixture which has been carefully dried by phosphorous pentoxide, the velocity is so small that it is not possible to bring about ignition by means of an electric spark, a mixture of perfectly dry carbon monoxide and oxygen appears to be incombustible in such a way. If, however, the mixture is heated by the insertion of a heating unit in the mixture, combustion will take place due to the presence of a trace of water vapor, but is extinguished when it is brought into dry oxygen.

I accomplish the means of eliminating carbon monoxide from the exhaust of a motor vehicle in the following manner employing the aforesaid principles of combustion in my invention which will more fully appear in the following specification and drawings.

Figure 1:
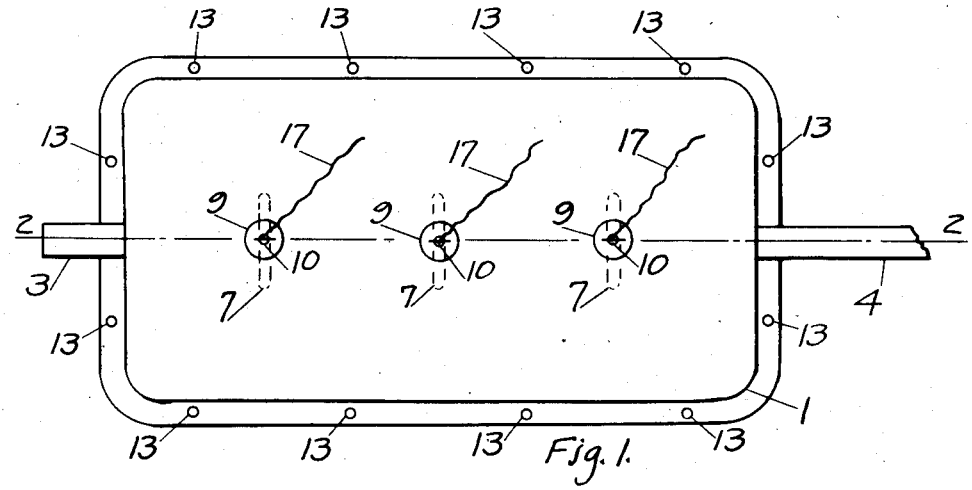
Figure 1 is a plan view.
Figure 2:
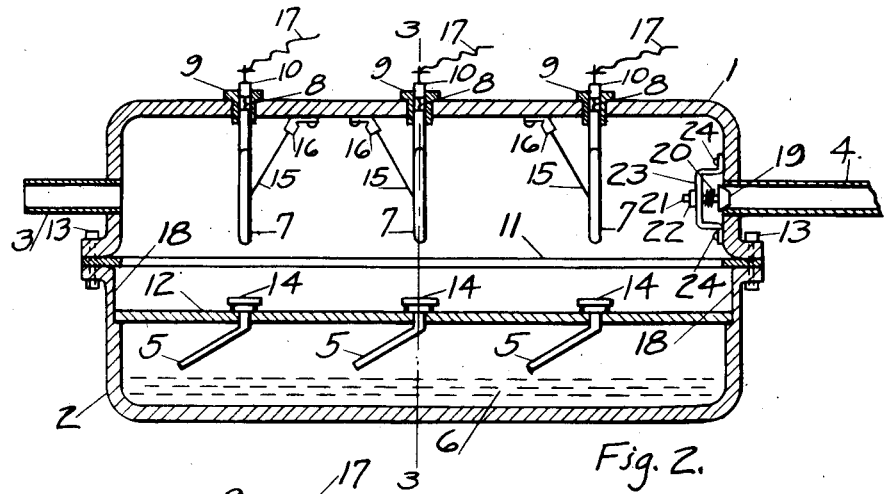
Figure 2 is a sectional view on the line 2—2.
Figure 3:
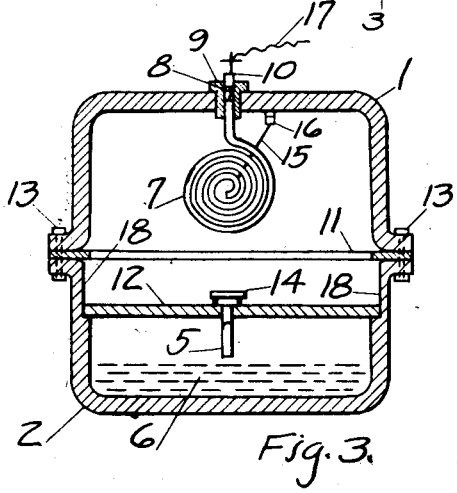
Figure 3 is a transverse sectional view on the line 3—3.

Referring to the drawings, 1 represents an upper casing and 2 a lower casing of a combustion chamber. The two casings are joined together by means of the bolts 13, and a gasket is inserted between the casings to insure an air and water tight joint. The upper casing is provided with a plurality of bushings 9 of insulating material into which bushings are inserted electrical heating units 7 and the said heating units are rigidly secured to the bushings. An electrical plug 10 is also inserted into the bushing 9 and an electrode 8 connects the heating unit 7 with the wire 17, which wire runs to the positive pole of a battery and furnishes the electricity to heat the electrical heating unit 7. Each individual heating unit is grounded to the upper casing 1 by means of the wire 15 of which one end is connected to the center of the heating unit 7 and the other end to the casing 1 by means of the terminal 16. The negative pole of the battery is connected to the exhaust pipe 4 thereby completing the electrical circuit.

The lower casing 2 is provided with a recess 18 around the entire perimeter, and a barrier 12 snugly fits into the recess. The barrier is provided with a plurality of tubular members 5 which depend on an angle from the said barrier and are for the purpose of providing a passage for the gas generated by the solution 6 to pass into the combustion chamber. A baffle plate 14 is placed over and a little above each tubular member 5 and is secured to the barrier 12. The baffle plates are for the purpose of preventing any of the solution of sodium chloride and water from being drawn up and into the combustion chamber.

The operation of the device is as follows: The exhaust from the motor forces the carbon monoxide thru the exhaust pipe 4, and the pressure of the exhaust gas will cause the valve 19 to open and allow the exhaust gas to enter the combustion chamber. As the gas is forced thru the combustion chamber it will come in contact with the electrical heating unit 7. By referring to the drawings it will be seen that I use a spiral electrical heating unit, which design allows the exhaust to freely pass thru the said spiral electrical heating unit.

When the gas enters the combustion chamber I use sodium chloride solution 6 to supply water vapor to facilitate the oxidation of CO.

To overcome this objectional feature I use a solution of sodium chloride and water 6 to provide the necessary hydrogen for the combustion of the carbon monoxide. It has been found by experiment that sodium chloride is productive of good results when dissolved in water, as the sodium chloride retards the heating of the water and a greater degree of heat is necessary to create the water vapor, thus causing a lower saturation point, and this water vapor acts as a catalyst and readily mixes with the carbon monoxide and forms the necessary hydrogen for combustion. As the gas leaves the exhaust pipe 4 and enters the combustion chamber it is mixed with water vapor from the solution 6 and a detonation takes place within the chamber caused by the heat of the electrical heating units 7, and the carbon monoxide is consumed by combustion and leaves the combustion chamber thru the exhaust pipe 3 in the form of carbon dioxide mixed with a small percentage of carbon monoxide. A small amount of air to assist combustion is also carried thru the exhaust pipe 3 into the combustion chamber.

The valve 19 closes with the explosion in the combustion chamber and prevents any back pressure on the exhaust pipe 4, and the said valve works automatically with the exhaust and intermittently as the exhaust is received from the motor and forced into the combustion chamber.

The valve 19 is provided with a valve stem 21 which works slidably thru the support 23. A nut 22 holds the valve stem in position and also may be used to regulate the tension of the valve spring 20 to hold the valve in contact with the exhaust pipe 4. The support 23 is secured to the upper casing by means of the studs 24.

What I claim is:

A carbon monoxide eliminator comprising a combustion chamber consisting of an upper and a lower casing adapted to be placed on an exhaust pipe, means to join the said casings together in an air and water tight manner, a plurality of electrical heating units depending into the upper casing, and the center of the heating units in alignment with the center of the said exhaust pipe, means to hold the heating units in position and connect them to an electrical circuit, said heating units of open spiral design to facilitate the free passage of gas thru and around the spirals and to radiate the greatest degree of heat for combustion of the said gas, the intake exhaust pipe leading to the combustion chamber provided with a valve positioned within the combustion chamber to admit the carbon monoxide within the combustion chamber.

In testimony whereof I affix my signature.

HAROLD E. STORY.